United States Patent
Nie

(10) Patent No.: US 10,540,709 B2
(45) Date of Patent: Jan. 21, 2020

(54) PRESENTATION OF DIGITAL DATA

(71) Applicant: eBay Inc., San Jose, CA (US)

(72) Inventor: YongZhi Nie, Shanghai (CN)

(73) Assignee: eBay Inc., San Jose, CA (US)

( * ) Notice: Subject to any disclaimer, the term of this patent is extended or adjusted under 35 U.S.C. 154(b) by 739 days.

(21) Appl. No.: 15/165,679

(22) Filed: May 26, 2016

(65) Prior Publication Data
US 2017/0345087 A1 Nov. 30, 2017

(51) Int. Cl.
G06Q 30/00 (2012.01)
G06Q 30/06 (2012.01)

(52) U.S. Cl.
CPC .................. G06Q 30/0643 (2013.01)

(58) Field of Classification Search
CPC ................................. G06Q 30/0643
USPC ...................................... 705/26, 27
See application file for complete search history.

(56) References Cited

U.S. PATENT DOCUMENTS

| | | | |
|---|---|---|---|
| 7,389,221 B1 | 6/2008 | Pearson et al. | |
| 9,195,774 B2 * | 11/2015 | Henkin | G06F 16/9574 |
| 2001/0000537 A1 | 4/2001 | Inala et al. | |
| 2002/0085025 A1 | 7/2002 | Busis et al. | |
| 2003/0208404 A1 | 11/2003 | Michie | |
| 2005/0033771 A1 * | 2/2005 | Schmitter | G06Q 30/02 |
| 2008/0154764 A1 | 6/2008 | Levine et al. | |
| 2010/0153831 A1 * | 6/2010 | Beaton | G06Q 30/02 |
| | | | 715/201 |
| 2011/0015996 A1 * | 1/2011 | Kassoway | G06F 16/9558 |
| | | | 705/14.49 |
| 2012/0054050 A1 * | 3/2012 | Ziegler | G06Q 20/202 |
| | | | 705/21 |
| 2012/0072547 A1 * | 3/2012 | Henkin | G06F 16/9574 |
| | | | 709/219 |
| 2013/0173402 A1 | 7/2013 | Young et al. | |
| 2014/0298243 A1 | 10/2014 | Le et al. | |
| 2015/0254745 A1 | 9/2015 | Meeboer | |
| 2015/0356446 A1 | 12/2015 | Greystoke et al. | |

FOREIGN PATENT DOCUMENTS

WO    2017/205677 A1    11/2017

OTHER PUBLICATIONS

"Chrome has double underlined words which links to monstermarketplace.com," BleepingComputer.com, Oct. 6, 2013, 8pgs. (Year: 2013).*

(Continued)

Primary Examiner — Robert M Pond
(74) Attorney, Agent, or Firm — SBMC

(57) ABSTRACT

A computer-implemented method of digital information presentation may include receiving a selection of an item reference from among digital data via a digital user interface. The method may further include receiving a request to search for information relating to the item reference. The method may include sending a request to search for the information relating to the item reference in the digital database. The method may also include receiving the information relating to the item reference. The method may further include presenting the information relating to the item reference via the digital user interface, the digital user interface including a purchase information element. The method may include facilitating a purchase of the item via the digital user interface.

20 Claims, 9 Drawing Sheets

(56) References Cited

OTHER PUBLICATIONS

International Search Report and Written Opinion, as issued in connection with International Patent Application No. PCT/US2017/034555, dated Aug. 2, 2017, 9 pgs.
International Preliminary Report on Patentability received for PCT Patent Application No. PCT/US2017/034555, dated Dec. 6, 2018, 8 pages.

* cited by examiner

PRESENTATION OF DIGITAL DATA

FIELD

The embodiments discussed herein are related to presentation of digital data.

BACKGROUND

As an ever-increasing amount of information is being made available electronically, typically over networks such as the Internet, it is increasingly difficult to navigate information or other content that may be of interest to a user. Sometimes there is too much information to present to a user on a single screen. In these situations, the information may be divided into discrete pages and the user is able to navigate to the individual pages through searching or by entering in a page address directly into an address bar.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

As an ever-increasing amount of information is being made available electronically, typically over networks such as the Internet, it is increasingly difficult to navigate information or other content that may be of interest to a user. Sometimes there is too much information to present to a user on a single screen. In these situations, the information may be divided into discrete pages and the user is able to navigate to the individual pages through searching or by entering in a page address directly into an address bar. Further, while browsing the Internet, the user may read or see something that triggers a desire to make a purchase. Using conventional systems, the user would leave what they are doing and navigate to another webpage where they may make the purchase. This problem created by technology may interrupt the activities of the user prior to making the purchase and often, the user may not resume that activity.

Some embodiments herein relate to a computer-implemented method of digital information presentation. For example, a digital database may be queried for information of an item. Before the digital database may be queried for information of the event, an information query tool may be presented in a digital user interface (e.g., a graphical user interface (GUI)). The information query tool may be presented in a browser or other application.

The digital database may be a cloud database configured to store information accessed over the Internet. For example, the digital database may store retail information for an on-line retailer that may sell goods and services (e.g., tickets to an event). Alternately or additionally, the digital database may store health information, or finance information, among other consumer information. Alternately or additionally, the digital database may store information used by a company or individual for business, such as on-line file storage, among other types of information.

Figure 1:
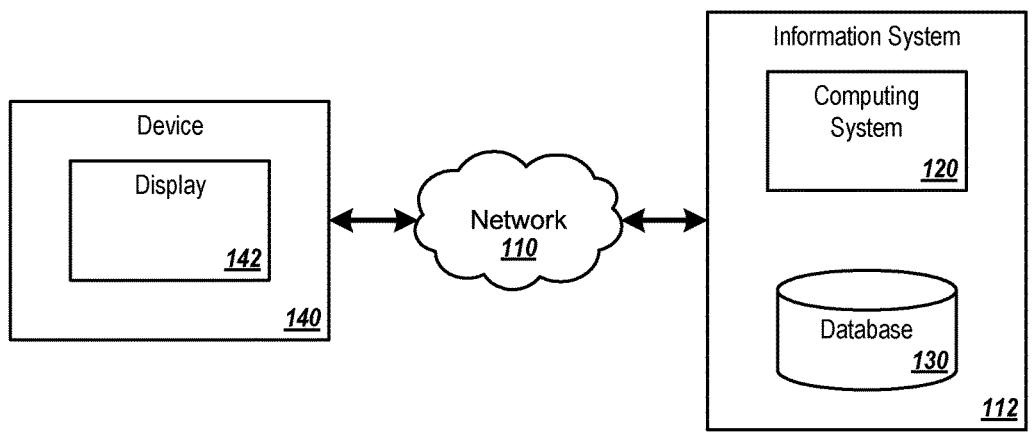
FIG. 1 illustrates an example system 100 configured to present digital information.

Turning to the figures, FIG. 1 illustrates an example system 100 configured to present digital information. The system 100 may be arranged in accordance with at least one embodiment described in the present disclosure. The system 100 may include a network 110, an information system 112 that includes a computing system 120 and a database 130, and a device 140 that includes a display 142.

The network 110 may be configured to communicatively couple the information system 112 with the device 140. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

The device 140 may be any electronic device configured to provide a user with access to one or more systems, which may include one or more servers and databases, through a network. For example, the device 140 may include a desktop computer, a laptop computer, a smartphone, a mobile phone, a tablet computer, or any other processing device configured to access information over a network or internally. In some embodiments, the device 140 may be configured to receive digital data from the information system 112 and present the digital data to a user of the device 140. In these and other embodiments, the device 140 may present the information visually using a display 142. Alternately or additionally, the device may present the information in audio, by tactile response, or by some other method.

In some embodiments, the information system 112 may be any configuration of hardware, such as servers and databases that are networked together and configured to perform a task. In some embodiments, the computing system 120 may be a single computing system that includes one or more processors and memory, such as a server or some other computing system, within the information system 112. Alternately or additionally, the computing system 120 may include multiple computing systems, such as multiple servers, that are networked together and configured to perform a task within the information system 112. Alternately or additionally, the computing system 120 may include computing systems and/or computer-readable-instructions that are configured to be executed by the information system 112 to perform the operations described in this disclosure. The database 130 may be any configuration of digital data storage.

In some embodiments, the information system 112 may be configured to provide a user, through the device 140, an ability to browse or search for information, services, or goods listed or included within the database 130 of the information system 112. The information system 112 may also be configured to provide the user, through the device 140, an ability to purchase services or goods listed or included within the database 130 of the information system 112 or in another database.

For example, the device 140 may be configured to present digital data via the display 142. The digital data may be from any source, such as a web hosting server. The digital data may include any type of data or content, such as webpages, news articles, or blog posts, etc. The digital data may also include one or more item references. An item reference may include text, a media item (e.g., image, video), etc. For example, an item reference may include a sports team name in a body of text. A user may use an input device (e.g., a mouse, a touch screen) to select the item reference. The device 140 may also receive an activation of a menu (e.g., a right click of a mouse, a long press on a touch screen). The device 140 may present a menu via the display 142. The menu may include at least one option to search for information (e.g., tickets) relating to the item reference. The device 140 may receive a selection of the at least one option. The device 140 may send a request to search for information pertaining to the item reference to the information system 112.

The information system 112 may receive the request to search for information pertaining to the item reference from the device 140. The information system 112 may search for the information pertaining to the item reference, such as in the database 130. The information system 112 may send information pertaining to the item reference to the device 140. The device 140 may present the information via the display 142, such as via a pop-up, in a new browser window, or a new application, etc. The information pertaining to the item reference may also include purchase information pertaining to how the user may make a purchase related to the item reference. In at least one embodiment, the user may initiate and complete a purchase without navigating to a new page.

In at least one embodiment, the information system 112 may be configured as an online marketplace for users to purchase items, such as tickets to an event. In these and other embodiments, the database 130 may include listings of goods or services to be sold that may be accessed by a user through a device, such as the device 140. In some embodiments, the information system 112 may allow the device 140 to browse through the listings of goods, services, buyer or seller information, or search for any information in the database 130.

In some embodiments, the computing system 120 may be configured to handle digital requests for presentation of digital data from the database 130. For example, a user may be accessing the information system 112 via the device 140 and the network 110. Based on the interaction with the information system 112, the user may send a digital request for information. For example, if the information system 112 is an online marketplace, the user may request information regarding items sold, such as a ticket to an event.

In general, the computing system 120 may be configured to handle the digital requests for information. In some embodiments, the digital request may include a request for information with multiple data entries in the database 130. In these and other embodiments, the computing system 120 may search the database 130 to determine the data entries in the database 130 that may fulfill the request. The computing system 120 may not send all of the data entries in the database 130 that may fulfill the request.

In at least one embodiment, the computing system 120 may determine a number of data entries in the database 130 that fulfill the request. When the number of data entries in the database 130 that fulfill the request is below a threshold, the computing system 120 may send all of the data entries in the database 130 that fulfill the request. When the number of data entries in the database 130 that fulfill the request is above the threshold, the computing system 120 may not send all of the data entries. In some embodiments, the threshold may be based on the device 140 that transmitted the request. For example, the threshold may be based on a size of the display 142 of the device 140. When the size of the display 142 is larger the threshold may be larger and vice versa. Alternately or additionally, the threshold may be based on the connection speeds between the device 140 and the computing system 120 over the network 110. When the connection speeds are higher, the threshold may be higher and vice versa.

For example, if the information system 112 is an online marketplace for tickets to an event, the digital request may be a request for a listing of tickets for the event. The database 130 may include data entries for each item sold in the online marketplace. The data entries in the database 130 may include data fields that include a date of the event, a price, a quantity of tickets seated next to each other, an item ID, and an item description, etc.

In some embodiments, the instructions for presenting the digital user interface may be provided by the computing system 120. In these and other embodiments, the digital user interface may be presented through a web browser. For example, the computing system 120 may provide computer readable instructions, such as HTML or other code, to the device 140, to allow the device 140 through the web browser, to render the digital user interface.

Alternately or additionally, the digital user interface may be a program installed on the device 140 that is run by the device 140 and/or a web browser on the device 140, such as a plug-in for a web browser.

In situations in which the system 100 collects personal information about users, or may make use of personal information, the users may be provided with an opportunity to control whether the information system 112, or device 140 collects user information (e.g., information about a user's social network, social actions or activities, profession, a user's preferences, purchase history, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the information system 112, or device 140.

Modifications, additions, or omissions may be made to the system 100 without departing from the scope of the present disclosure. For example, the information system 112 may include additional components and/or networks than those illustrated in or described with respect to FIG. 1. For example, the information system 112 may include additional databases, servers, and other computing systems configured to perform other tasks for the information system 112.

Alternately or additionally, the computing system 120 as described may be located outside of the information system 112. In these and other embodiments, the computing system 120 may be coupled to the network 110 and may access the database 130 over the network 110. Alternately or additionally, the database 130 may be separate from the information system 112. In these and other embodiments, the database 130 may be communicatively coupled to the network 110. Alternately or additionally, the computing system 120 and/or database 130 may be part of the device 140. Alternately or additionally, the system 100 may include a separate purchasing system (not illustrated).

FIGS. 2A-2D illustrate examples of different configurations of a digital user interface 200 that presents digital information. The different configurations of the digital user interface 200 may be arranged in accordance with at least one embodiment described in the present disclosure. FIG. 2E illustrates an example of a different configuration of a digital user interface 250 that presents digital information. As illustrated in FIGS. 2A-2E, the digital user interfaces 200, 250 may be implemented by a web browser or an application that is presenting a webpage based on instructions from a computing system. The computing system discussed with respect to FIGS. 2A-2E may be any computing system discussed or contemplated by this disclosure, such as the computing systems 120 or 500 of FIGS. 1 and 5. Alternately, the digital user interfaces 200, 250 may be implemented by some other program based on instructions received from a computing system.

Figure 2A:
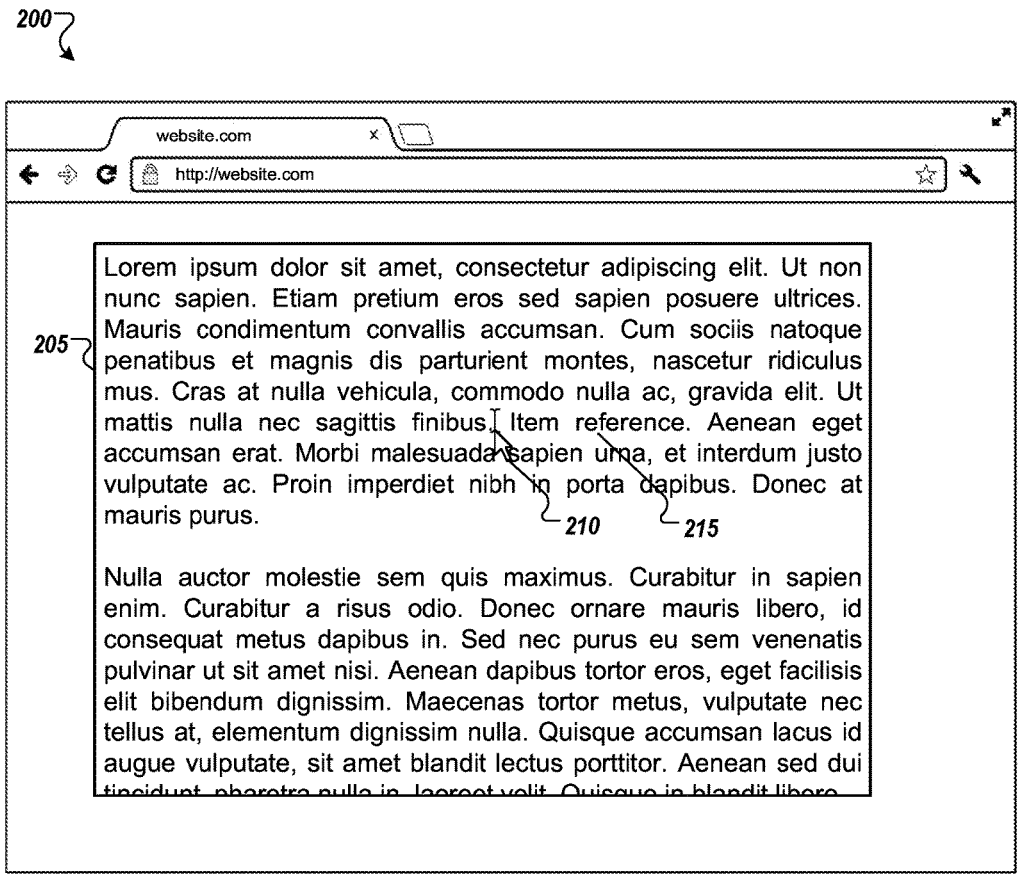
FIGS. 2A-2D illustrate examples of different configurations of a digital user interface that presents digital information.

FIG. 2A may illustrate the digital user interface 200 that may be provided to a device from a computing system for presentation to a user in response to the reception of a request for data from the user at the computing system. For example, the computing system may include a web hosting server and may present an electronic document via the digital user interface 200. The electronic document may include one or more media areas 205. As illustrated, the digital user interface 200 includes a text-based media area 205. In at least one embodiment, the digital user interface 200 may be configured to display text, images, videos, etc. in the one or more media areas 205.

The media area may include an item reference 210. The item reference 210 may directly or indirectly refer to an item. For example, the item may include a ticket to a sporting event of a particular sports team on a particular day. The item reference 210 may include a name of the sports team. As illustrated, the item reference 210 is text-based. In at least one embodiment, the item reference 210 may include text, an image, a video, or a combination thereof.

Figure 2B:
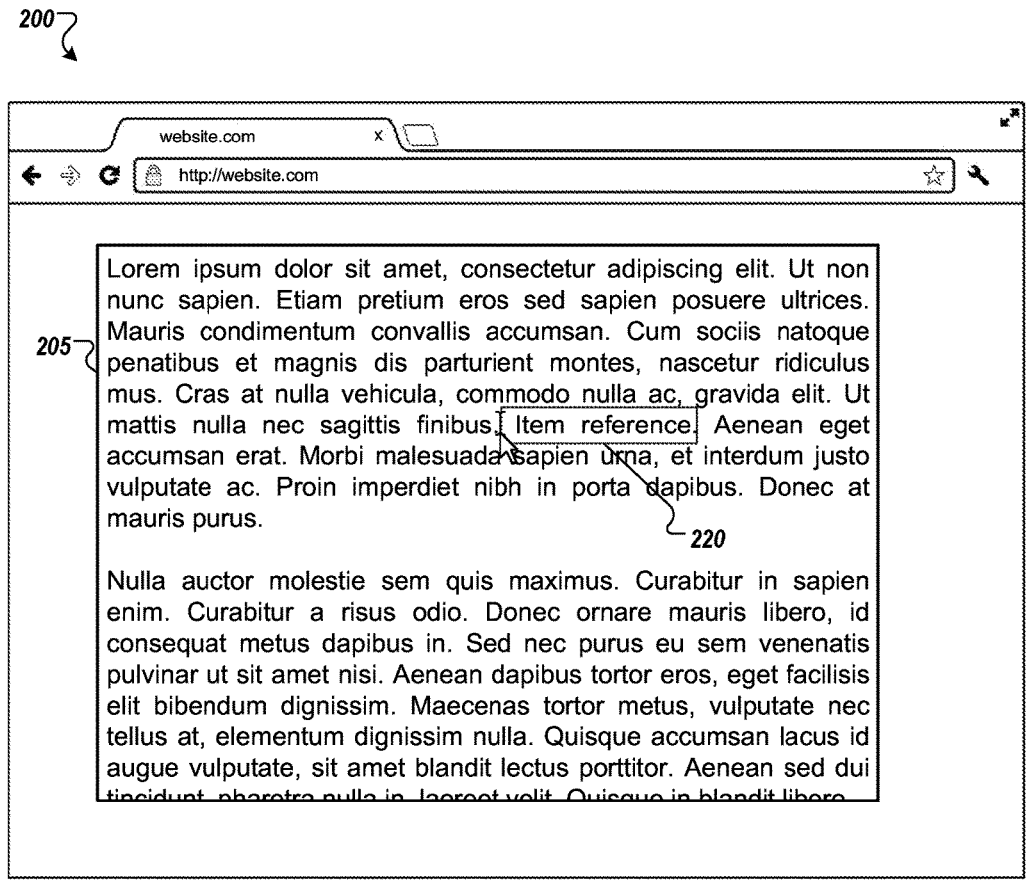

The digital user interface 200 may be configured to receive a selection of the item reference 210. As illustrated, a selection tool 215 (e.g., a cursor, user touch input via a touch screen) may be used to select the item reference 210. For example, with a mouse, a user may select the item reference 210. FIG. 2B illustrates the digital user interface 200 with an example selection 220 of the item reference 210.

Figure 2C:
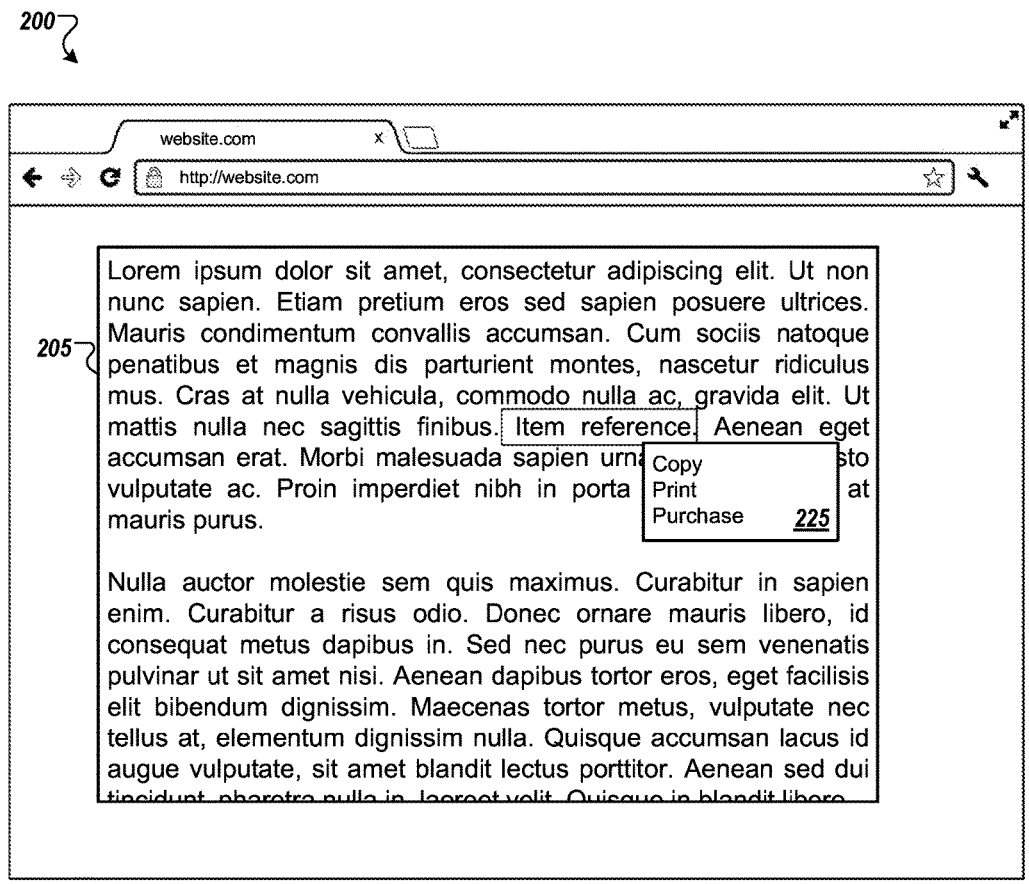

FIG. 2C illustrates an example digital user interface 200 that may be presented in response to receiving an activation of a menu 225. The activation may include a right click of the cursor on the selection 220 or a touch input on the selection 220 (e.g., a long press). The menu 225 may include one or more interactive elements (e.g., copy, print, purchase). A user may interact with the menu 225 by navigating to or engaging with the menu 225. For example, a user clicking on an interactive element in the menu 225 may be the user interaction with the menu 225. In another example, the user clicking on a "purchase" interactive element of the menu 225 may initiate generation of a request for more information pertaining to the item reference 210. The request may be sent to an information system (e.g., information system 112 of FIG. 1), where the request may be processed, as further described in conjunction with FIG. 4.

Figure 2D:
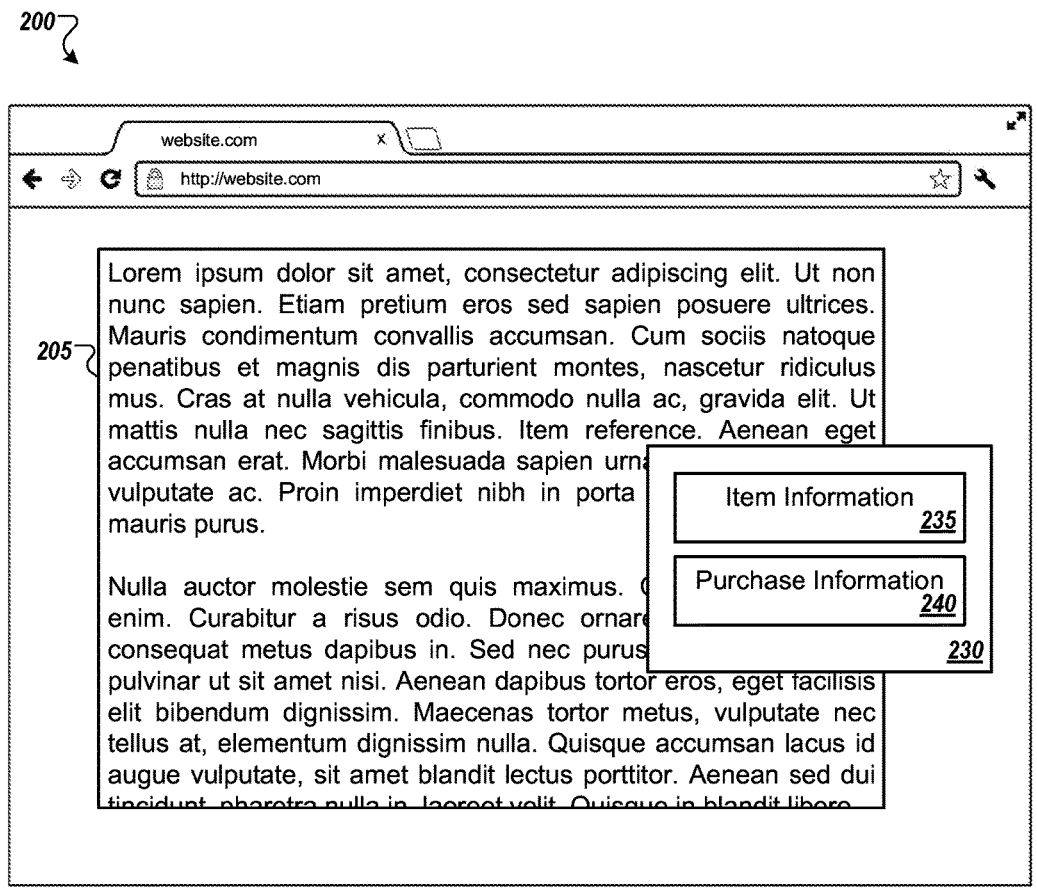
Figure 2E:
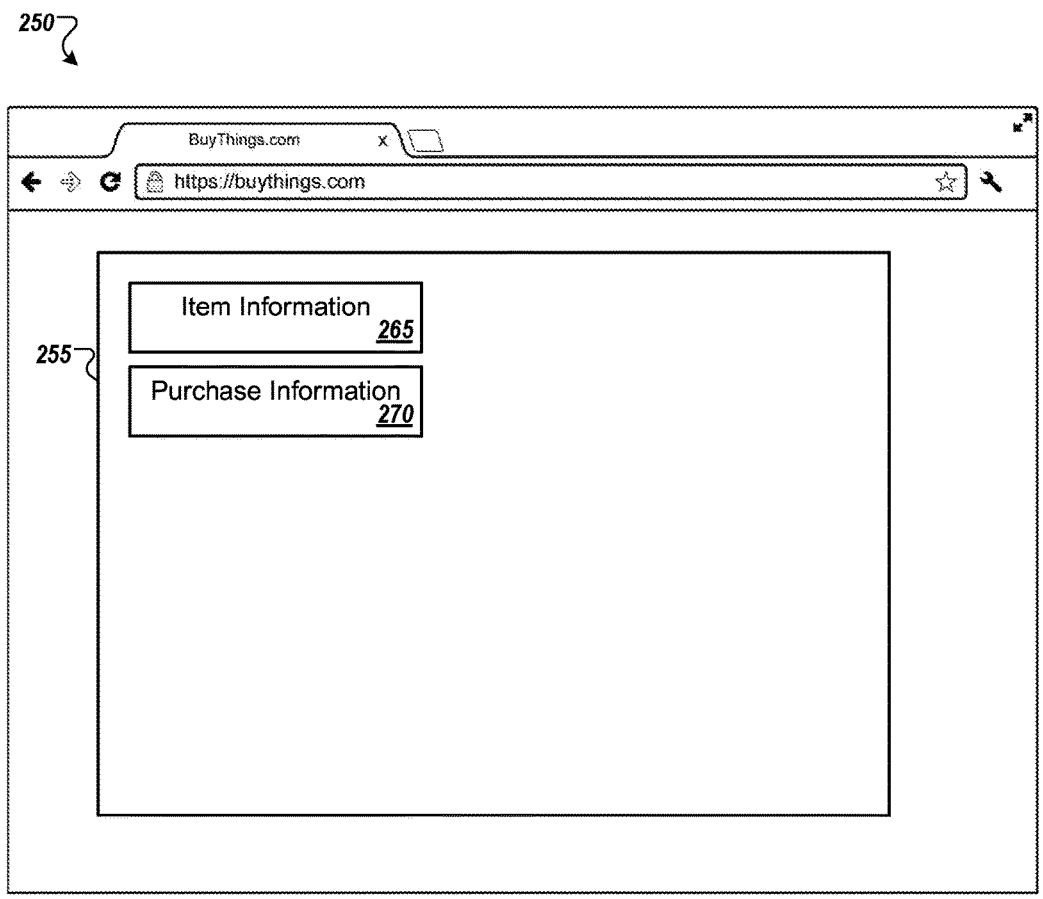
FIG. 2E illustrates an example of a different configuration of a digital user interface that presents digital information.

FIG. 2D illustrates an example digital user interface 200 that may be presented in response to receiving information pertaining to the item reference 210. The information pertaining to the item reference 210 may be presented in an information area 230. The information area 230 may include an overlay area on top of the one or more media areas 205. In at least one embodiment, the information area 230 includes a popup, a new browser window or another tab in a browser. The information area 230 may include item information 235. The item information 235 may include various information of the item, such as a name, description, an image, a video, a time, or a date. The item information may include a digital representation of an item. For example, when the item includes a ticket to a sporting event, the item information 235 may include a name of one or more teams playing at the sporting event, a date and start time, seat information (e.g., section, row, seat), or one or more nearby seats (e.g., other adjacent seats that may be purchased in a group), etc. The information pertaining to the item reference 210 may include purchase information 240. The purchase information 240 may include details on how to purchase the item, such as a price at which the item may be sold, discounts, or sales, etc. The purchase information 240 may also include a link to a purchase page where the user may initiate a purchase of the item. In at least one embodiment, the purchase information 240 may include a purchase tool that permits a user to purchase the item while the digital user interface 200 is being presented. The purchase information 240 may include a tool that may receive an item purchase request from the user. The item purchase request may be forwarded to an information system that handles transactions and processed at the information system. A confirmation message may be sent to the digital user interface 200 and the digital user interface 200 may present the confirmation message.

FIG. 2E illustrates an example purchase page 250 that may be presented in response to an activation of a link in the purchase information 240 of FIG. 2D. In at least one embodiment, the purchase page 250 may be a variation of or part of the digital user interface 200 of FIGS. 2A-D. Alternatively, the purchase page 250 may include a separate digital user interface and may be operated by a separate entity. For example, a first entity may handle information provision for an item (as in FIGS. 2A-D) and a second entity may handle purchases of the item (as in FIG. 2E). In at least one embodiment, the purchase page 250 may include an electronic document 255 that may include item information 265 and purchase information 270. The item information 265 may include the same or different information as the item information 235 of FIG. 2D. The purchase information 270 may include the same or different information as the purchase information 240 of FIG. 2D. The purchase information 270 may include a tool that may receive an item purchase request from the user. The item purchase request may be forwarded to an information system that handles transactions and processed at the information system. A confirmation message may be sent to the purchase page 250 and the purchase page 250 may present the confirmation message.

Figure 3:
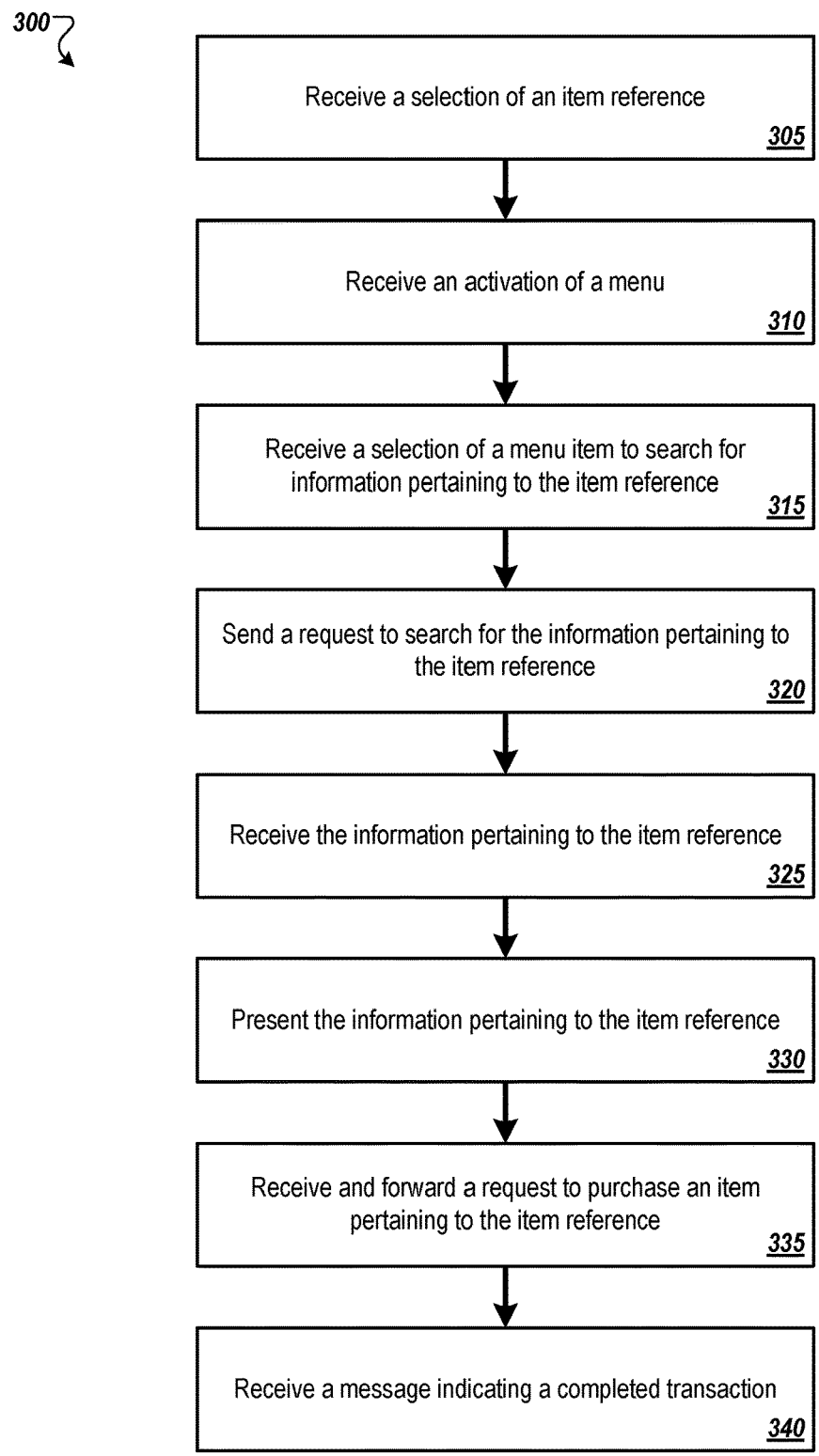
FIG. 3 illustrates a flowchart of an example computer-implemented method of digital information presentation.

FIG. 3 illustrates a flowchart of an example computer-implemented method 300 of digital information presentation. The method 300 may be arranged in accordance with at least one embodiment described in the present disclosure. The method 300 may be implemented, in some embodiments, by a system, such as the system 100 and/or 500 of FIGS. 1 and 5, respectively. Although illustrated as discrete blocks, various blocks may be divided into additional blocks, combined into fewer blocks, or eliminated, depending on the desired implementation. The method 300 may be performed, at least in part, by processing logic in a device, such as the device 140 of FIG. 1.

The method 300 may begin at block 305, where processing logic may receive a selection of an item reference in an electronic document. For example, the electronic document may include a webpage with text and/or images. The item reference may include a subset of the text and/or images. For example, the electronic document may include a web-based news article and the item reference may include one or more words of the text. The electronic document may also include an informational webpage, such as a wiki page for a sports team. The item reference may include a name of the sports team. The processing logic may receive a selection of the sports team name (e.g., in response to a user selecting the sports team name with a cursor or a touch-enabled device). The selection of the item reference may include a selection by a cursor or by a touch-and-slide gesture.

At block 310, the processing logic may receive an activation of a menu. For example, while the item reference is selected, the processing logic may receive user input to activate the menu. The user input may include a right mouse click, or a long press gesture on a touch-enabled device, etc. The processing logic may present the menu in response to receiving the activation of the menu. The menu may include one or more options to search for information of the item reference.

At block 315, the processing logic may receive a selection of the menu item to search for information pertaining to the item reference. The processing logic may receive user input to select an option in the menu to make a purchase of an item based on the item reference. For example, the processing logic may include tickets to a game played by the sports team, a concert performed by a musician, etc.

At block 320, the processing logic may send a request to search for information pertaining to the item reference. The request may include the item reference. The information pertaining to the item reference may include goods or services that relate to the item reference. For example, when the item reference relates to "housekeeping," the information pertaining to the item reference may include listings for housekeeping supplies (e.g., cleaning tools) as well as housekeeping services (e.g., a maid service). When the item reference includes an image, the processing logic may identify metadata associated with the image. The processing logic may send the metadata with the request and the metadata may be used to identify information pertaining to the item reference in a remote storage device. The processing logic may also identify other metadata associated with a device and/or user. For example, the processing logic may identify a location (e.g., based on GPS, Wi-Fi triangulation) of a device associated with the processing logic. The processing logic may also identify user data, such as user preferences, purchase history, etc. The processing logic may send the other metadata (e.g., the location data, the user data) along with the request.

At block 325, the processing logic may receive the information pertaining to the item reference. The information pertaining to the item reference may include one or more listings for goods and/or services. The listings for goods and/or services may be listings on multiple different webpages. At block 330, the processing logic may present the information pertaining to the item reference in a display.

At block 335, the processing logic may receive a request to purchase an item pertaining to the item reference. For example, the request to purchase may include a request to purchase a good or service in the one or more listings. The processing logic may send the request to purchase the item. In at least one embodiment, the processing logic may send the request to a different entity (e.g., a transaction entity) than the entity that provided the information that was received at block 325. In at least one embodiment, the processing logic may request and/or receive payment information from a user to purchase the item. At block 340, the processing logic may receive a transaction message indicating a completed transaction.

One skilled in the art will appreciate that, for this and other processes and methods disclosed herein, the functions and/or operations performed in the processes and methods may be implemented in differing order. Further, the outlined functions and operations are only provided as examples, and some of the functions and operations may be optional, combined into fewer functions and operations, or expanded into additional functions and operations without detracting from the essence of the disclosed embodiments.

Figure 4:
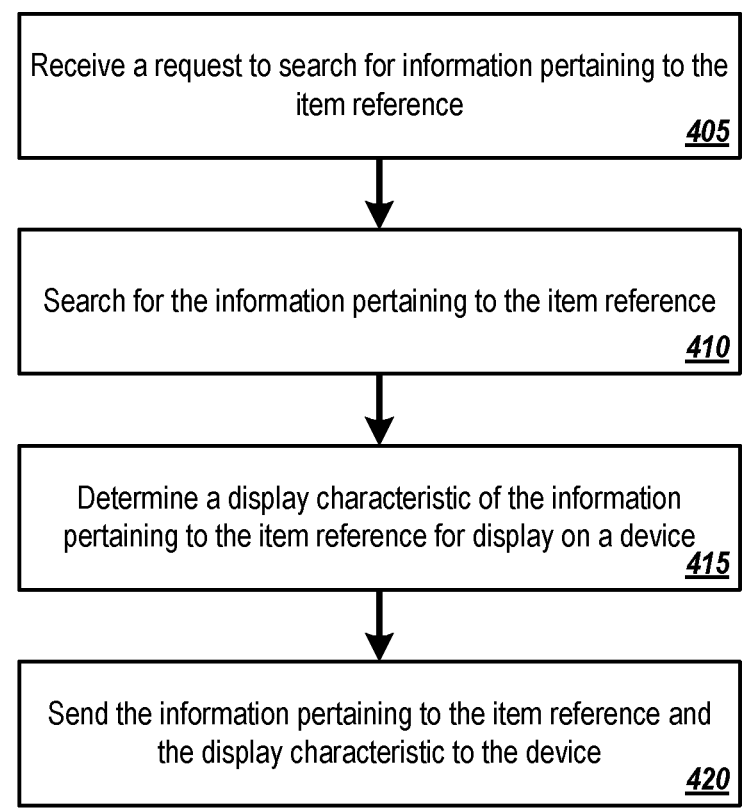
FIG. 4 illustrates a flowchart of another example computer-implemented method of digital information presentation.

FIG. 4 illustrates a flowchart of another example computer-implemented method 400 of digital information presentation. The method 400 may be arranged in accordance with at least one embodiment described in the present disclosure. The method 400 may be implemented, in some embodiments, by a system, such as the system 100 and/or 500 of FIGS. 1 and 5, respectively. Although illustrated as discrete blocks, various blocks may be divided into additional blocks, combined into fewer blocks, or eliminated, depending on the desired implementation.

The method 400 may begin at block 405, where processing logic may receive a request to search for information pertaining to an item reference. The request may include the item reference as one or more text-based words that may be used to search for information. For example, the item reference may include a name of a performer, team, event, product, or service, etc.

At block 410, the processing logic may search for the information pertaining to the item reference. The processing logic may use the item reference search for information. In at least one embodiment, the processing logic may search a database (e.g., database 130 of FIG. 1) for information pertaining to the item reference. For example, when the item reference includes a name of a rock band, the processing logic may search for concerts, merchandise, etc. of the band that may be for sale. In at least one embodiment, the request received at block 405 may also include a location (e.g., based on GPS, Wi-Fi triangulation) of a device that sent the request. The request received at block 405 may also include user data, such as user preferences, purchase history, etc. The processing logic may use the location data and/or user data when searching for information pertaining to the item reference. For example, when the item reference includes a name of a rock band, the processing logic may search for a concert of the band near the location of the device that sent the request. When using the a purchase history of the user to identify information pertaining to the item reference, the processing logic may, for example, identify items based on the item reference in view of the purchase history of the user. For example, when the item reference includes a name of a rock band, the processing logic may search for other concerts the user has attended, identify seats where the user sat, and identify similar seats for an upcoming concert of the band. In at least one embodiment, the processing logic may identify multiple listings pertaining to the item reference. In such embodiments, the processing logic may filter and/or prioritize the listings based on any criteria, such as price, date, location, user purchase history, etc.

At block 415, the processing logic may determine a display characteristic of the information pertaining to the item reference for display on a device. The display characteristic may include instructions for how to present the information pertaining to the item reference in a display. For example, the display characteristic may include an instruction to display as many listings as will fit on a display device without scrolling. The display characteristic may include an instruction to display multiple prioritized listings according to their respective priorities. The request received at block 405 may include device information that may describe a display property of a device (e.g., a display size, resolution, aspect ratio) that is to present the information pertaining to the item reference. The processing logic may send a device-specific display characteristic based on the display properties. For example, the processing logic may filter the listings based on the display size and the display characteristic indicates which listings are to be displayed after the filter is applied. At block 420, the processing logic may send the information pertaining to the item reference and the display property of a device.

One skilled in the art will appreciate that, for this and other processes and methods disclosed herein, the functions and/or operations performed in the processes and methods may be implemented in differing order. Further, the outlined functions and operations are only provided as examples, and some of the functions and operations may be optional, combined into fewer functions and operations, or expanded into additional functions and operations without detracting from the essence of the disclosed embodiments.

Figure 5:
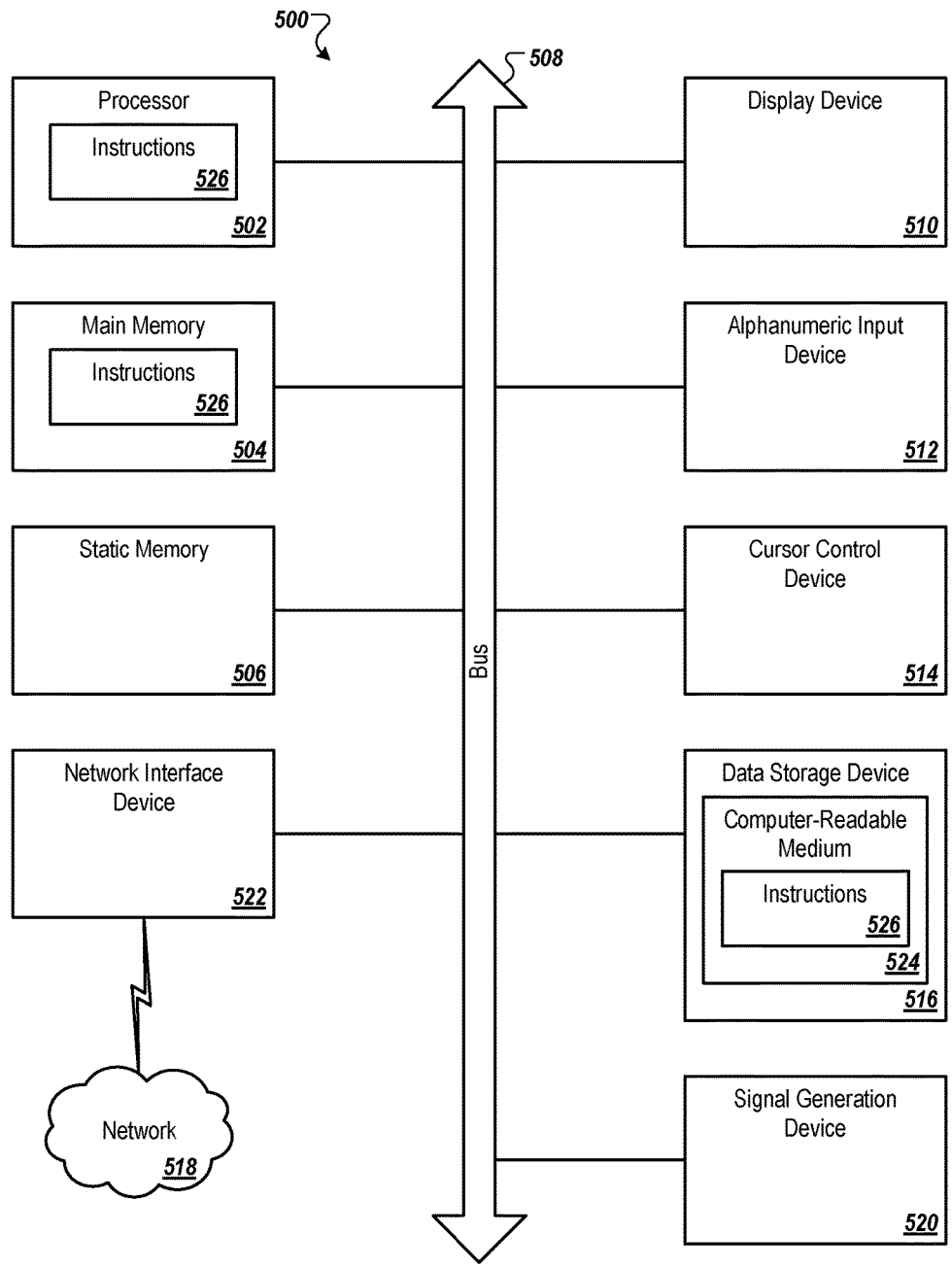
FIG. 5 illustrates a diagrammatic representation of a machine in the example form of a computing device within which a set of instructions, for causing the machine to perform any one or more of the methods discussed herein, may be executed.

FIG. 5 illustrates a diagrammatic representation of a machine in the example form of a computing device 500 within which a set of instructions, for causing the machine to perform any one or more of the methods discussed herein, may be executed. The computing device 500 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more general-purpose processing devices such as a microprocessor, central processing unit, or the like. More particularly, the processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also include one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In one implementation, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 (e.g., in system 100) embodying any one or more of the methods or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 526 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method of digital information presentation, the method comprising:
    displaying digital data on a page via a digital user interface; and
    without navigating away from the page:
        receiving a user-defined input selecting an item reference from among the digital data via the digital user interface;
        receiving, based at least in part on the user-defined input selection, an activation of a menu, wherein the menu is displayed as part of an overlay area and includes an item information element to search for item information and a purchase information element to search for purchase information;
        receiving a selection of the item information element;
        sending a request to search for information relating to the item reference;
        receiving listings associated with the information relating to the item reference;
        prioritizing the listings associated with the information relating to the item reference based on user data describing one or more characteristics of a user;
        presenting the prioritized listings as part of the overlay area via the digital user interface and according to respective priorities of the prioritized listings; and
        receiving a purchase request to purchase an item from the prioritized listings via the digital user interface.

2. The computer-implemented method of claim 1, wherein the user-defined input selecting the item reference includes a selection by a cursor or by a touch-and-slide gesture.

3. The computer-implemented method of claim 1, wherein the activation of the menu includes a right click of a mouse or a long press gesture.

4. The computer-implemented method of claim 1, wherein the selection of the item reference, the activation of the menu, and the selection of the item information element are received via a browser.

5. The computer-implemented method of claim 1, wherein the item reference is text-based or a digital image.

6. The computer-implemented method of claim 1, wherein presenting the prioritized listings as part of the overlay area via the digital user interface comprises:
    determining one or more display characteristics associated with the digital user interface; and
    displaying the prioritized listings on the digital user interface according to the one or more display characteristics.

7. The computer-implemented method of claim 1, wherein the user data describes at least one of user preferences of the user, location information associated with a user device of the user, and a purchase history associated with the user.

8. The computer-implemented method of claim 1, wherein the listings associated with the information relating to the item reference list products or services for sale.

9. The computer-implemented method of claim 8, further comprising receiving a purchase request to purchase a product or service of the prioritized listings.

10. A system, comprising:
a memory; and
a processor operatively coupled to the memory, the processor being configured to perform operations comprising:
displaying digital data on a page via a digital user interface; and
without navigating away from the page:
receiving a selection of an item reference from among the digital data via the digital user interface;
receiving an activation of a menu, wherein the menu is displayed as part of an overlay area and includes an item information element to search for item information and a purchase information element to search for purchase information;
receiving a selection of the item information element;
sending a request to search for information relating to the item reference;
receiving listings associated with the information relating to the item reference;
prioritizing the listings associated with the information relating to the item reference based on user data describing one or more characteristics of a user;
presenting the prioritized listings as part of the overlay area via the digital user interface and according to respective priorities of the prioritized listings; and
receiving a purchase request to purchase an item from the prioritized listings via the digital user interface.

11. The system of claim 10, wherein the selection of the item reference includes a selection by a cursor or by a touch-and-slide gesture.

12. The system of claim 10, wherein the activation of the menu includes a right click of a mouse or a long press gesture.

13. The system of claim 10, wherein the selection of the item reference, the activation of the menu, and the selection of the item information element are received via a browser.

14. The system of claim 10, wherein presenting the prioritized listings as part of the overlay area via the digital user interface by the processor comprises:
determining one or more display characteristics associated with the digital user interface; and
displaying the prioritized listings on the digital user interface according to the one or more display characteristics.

15. A non-transitory computer-readable medium having encoded therein programming code executable by a processor to perform or control performance of operations comprising:
displaying digital data on a page via a digital user interface; and
without navigating away from the page:
receiving a selection of an item reference from among the digital data via the digital user interface;
receiving an activation of a menu, wherein the menu is displayed as part of an overlay area and includes an item information element to search for item information and a purchase information element to search for purchase information;
receiving a selection of the item information element;
sending a request to search for information relating to the item reference;
receiving listings associated with the information relating to the item reference;
prioritizing the listings associated with the information relating to the item reference based on user data describing one or more characteristics of a user;
presenting the prioritized listings as part of the overlay area via the digital user interface and according to respective priorities of the prioritized listings; and
receiving a purchase request to purchase an item from the prioritized listings via the digital user interface.

16. The non-transitory computer-readable medium of claim 15, wherein the selection of the item reference includes a selection by a cursor or by a touch-and-slide gesture.

17. The non-transitory computer-readable medium of claim 15, wherein the activation of the menu includes a right click of a mouse or a long press gesture.

18. The non-transitory computer-readable medium of claim 15, wherein the selection of the item reference, the activation of the menu, and the selection of the item information element are received via a browser.

19. The non-transitory computer-readable medium of claim 15, wherein the item reference is text-based or a digital image.

20. The non-transitory computer-readable medium of claim 15, wherein presenting the prioritized listings as part of the overlay area via the digital user interface comprises:
determining one or more display characteristics associated with the digital user interface; and
displaying the prioritized listings on the digital user interface according to the one or more display characteristics.

* * * * *